United States Patent [19]

Yoshimura et al.

[11] Patent Number: 5,069,990
[45] Date of Patent: Dec. 3, 1991

[54] SEALED ALKALINE SECONDARY BATTERY

[75] Inventors: Koji Yoshimura; Hideo Yasuda, both of Kyoto, Japan

[73] Assignee: Japan Storage Battery Co., Ltd., Kyoto, Japan

[21] Appl. No.: 419,250

[22] Filed: Oct. 10, 1989

[51] Int. Cl.⁵ .................... H01M 2/18; H01M 10/24
[52] U.S. Cl. .................................. 429/206; 429/145
[58] Field of Search ............... 429/222, 219, 206, 144, 429/145, 247, 249, 223

[56] References Cited

U.S. PATENT DOCUMENTS

| | | | |
|---|---|---|---|
| 3,104,990 | 9/1963 | Solomon et al. | 429/206 |
| 3,174,878 | 3/1965 | Peters | 429/222 |
| 4,086,401 | 4/1978 | Sundberg et al. | 429/145 |
| 4,192,908 | 3/1980 | Himy et al. | 429/229 X |
| 4,220,693 | 9/1980 | DiPalma et al. | 429/145 R |
| 4,288,503 | 9/1981 | Goldberg | 429/145 |
| 4,539,256 | 9/1985 | Shipman | 264/41 X |
| 4,544,616 | 10/1985 | Poa et al. | 429/222 |
| 4,699,857 | 10/1987 | Giovannoni et al. | 429/204 |

*Primary Examiner*—Anthony Skapars
*Attorney, Agent, or Firm*—Sughrue, Mion, Zinn, Macpeak & Seas

[57] ABSTRACT

A sealed alkaline secondary battery with a cadmium negative electrode employs a micro-porous separator having circular or elliptic pores, to thereby eliminate the occurrence of internal short-circuiting and to improve the oxygen gas absorption ability of the battery.

19 Claims, 1 Drawing Sheet

SEALED ALKALINE SECONDARY BATTERY

BACKGROUND OF THE INVENTION

The present invention relates to a sealed alkaline secondary battery with a cadmium negative electrode.

A typical example of an alkaline secondary battery is a nickel cadmium battery. Recently, there has been a strong demand for a battery with increased capacity due to size and weight reductions in electrical equipment. In order to meet the demand, a sintered electrode, which has been used as a negative electrode, has been replaced by a plastic bonded electrode. However, when repeatedly charged and discharged, a battery with a negative electrode is likely to be internally short-circuited earlier than a battery with a sintered negative electrode. The internal short-circuit problem is caused by a phenomenon known as "migration" in which cadmium active material grows and transfers from the negative electrode to the positive electrode. An nonwoven separator used in a sealed battery cannot prevent the internal short-circuit caused by the growth of the cadmium active material.

In order to suppress the migration of cadmium active material, a few methods have been proposed. The methods, and problems accompanying the methods, are briefly described as follows.

A first method is directed to adding an additive such as boric acid to the electrolyte to decrease the solubility of cadmium. The method suffers from a difficulty that, during charging and discharging, the polarization is increased, and therefore the discharge capacity is decreased.

A second method relates to mixing a large quantity of electrically conductive material such as nickel powder with the negative active material. The method has the following disadvantages. The energy density of the electrode is decreased. In addition, the method is not extremely effective in suppressing migration. For instance, the nominal capacity when the battery treated according to the second method is charged and discharged with a current of 1 C, its service life is no more than 1200 cycles. On the other hand, a battery with a sintered cadmium negative electrode can be charged and discharged at least 2000 cycles. Thus, the service life of the battery in question is about half that of the latter battery.

A third method teaches using a micro-porous separator having rectangular micro-pores. Cadmium active material cannot grow through the micro-porous separator, and therefore the method can substantially completely prevent the internal short-circuit caused by the growth of cadmium active material. However, the method is greatly disadvantageous in that it cannot be applied to sealed batteries. In a sealed battery, at the end of the charging period or when the battery is overcharged, oxygen gas produced from the positive electrode is absorbed through the reaction described by equation (1), whereby increased pressure in the battery is prevented. That is, the battery is maintained to be sealed. This function is based on the use of a so-called "open separator"

$$O_2 + 2H_2O + 4e \rightarrow 4OH \quad (1)$$

The micro-porous separator whose micro-pores are rectangular is extremely low in oxygen gas permeability. Therefore, with the micro-porous separator, oxygen gas produced at the end of the charging period or during over-charging has difficulty reaching the negative electrode. Accordingly, the oxygen gas absorbing reaction scarcely takes place with the negative electrode, so that the pressure in the battery is increased. Finally, the safety valve operates to reduce the electrolyte.

As is apparent from the above description, for the nickel cadmium battery using the plastic bonded cadmium negative electrode, a method has not been provided which is effective in preventing the internal short-circuiting caused by migration of cadmium active material.

On the other hand, a novel nickel cadmium battery has been proposed in which the charging of the negative electrode is accomplished before or simultaneously with the end of charging of the positive electrode. The novel nickel cadmium battery is designed so that, at the end of charging, the considerably large potential difference of the negative electrode is detected for control of the charging operation. That is, the novel nickel cadmium battery is a sealed battery which features higher capacity and a shorter charging time than the conventional nickel-cadmium battery. However, the novel nickel-cadmium battery is still disadvantageous because the potential difference between the positive electrode and the negative electrode is as high as 1.9 volts at the end of charging. As a result, the migration of cadmium active material is liable to occur, and therefore the internal short-circuiting may take place even earlier than in the conventional-nickel cadmium battery.

The battery is a sealed battery in which the overcharging is carried out for a short period of time. However, oxygen gas is produced from the positive electrode at the end of charging. In addition, oxygen gas is also easy to be produced by aging. Thus, the battery will produce a relatively large quantity of oxygen gas. Accordingly, when using the rectangular micro-pore type micro-porous separator, the oxygen gas thus produced cannot be absorbed with the negative electrode.

Thus, there has been a strong demand for a method which prevents the occurrence of the internal short-circuiting due to the growth of cadmium active material, and which maintains the oxygen gas absorbing function substantially unchanged.

SUMMARY OF THE INVENTION

Accordingly, an object of the present invention is to eliminate the above-described drawbacks accompanying a conventional sealed alkaline secondary battery.

More specifically, an object of the present invention is to provide a sealed alkaline secondary battery which prevents the occurrence of internal short-circuiting due to the growth of cadmium active material, and which offers a long service life.

The foregoing object and other objects of this invention have been achieved by the provision of a sealed alkaline secondary battery with a cadmium negative electrode, which, according to the invention, comprises a micro-porous separator having circular or elliptic micro-pores.

The nature, principle and utility of the invention will become more apparent from the following detailed invention when read in conjunction with the accompanying drawing.

DETAILED DESCRIPTION OF THE INVENTION

Figure 1:
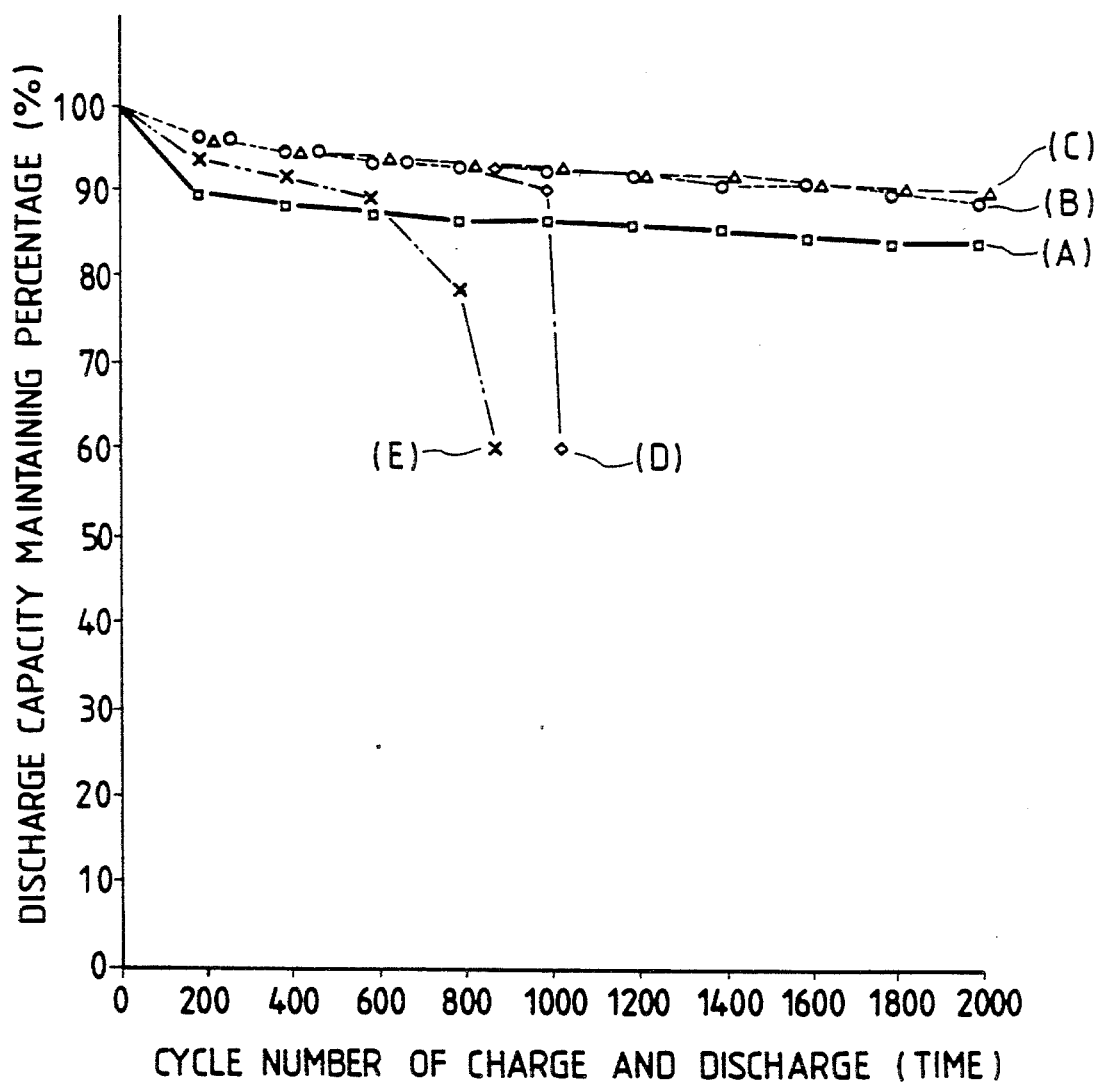
FIG. 1 is a graphical representation for comparison of the discharge capacity maintaining percentages of sealed alkaline secondary batteries according to this invention with those of a conventional alkali secondary battery and an alkaline secondary battery manufactured for comparison.

It has been found that, when a micro-porous separator having circular or elliptic pores is used in an sealed alkaline secondary battery, the oxygen gas absorbing performance is improved, and the occurrence of internal short-circuits due to the migration of cadmium active material is prevented.

Further, it has been found that the use of the micro-porous separator in combination with an nonwoven separator will prevent the micro-porous separator from being broken during battery assembly and will provide a larger discharge capacity than the use of the micro-porous separator alone.

In addition, it has been found that the above-described effects of the use of the micro-porous separator having circular or elliptic pores are significant with a nickel-cadmium battery which is designed so that the negative electrode is charged at the same time or before the end of charging of the positive electrode.

The present invention has been developed on the above-described findings.

In the present invention, a micro-porous separator having circular or elliptic micro-pores is employed. The separator is formed by a casting extraction process as disclosed in U.S. Pat. No. 4,539,256 by using polyethylene (Trade name "PM10E or "PM10W" manufactured by RAI (USA) Co.) or by using polypropylene (Trade name "PMP15E" or "PMP15W" manufactured by RAI (USA) Co.). The separator has circular or elliptic pores which are three-dimentional.

A micro-porous separator which is substantially equal in pore diameter, material, and thickness to the above-described one has been made of polypropylene by an extrusion type drawing method (Trade name "Jularguard (phonetic) 3401" manufactured by Cellaneed (phonetic) Co.). The separator has rectangular micro-pores, and it is used mainly for vented alkaline secondary batteries.

The following Table 1 is to clarify characteristics of the micro-porous separators described above.

TABLE 1

| Name | Thickness (μm) | Pore dia (μm) | Pore shape |
|---|---|---|---|
| PM10 | about 28 | about 0.095 | Circular or elliptic |
| PM15E | about 38 | about 0.16 | Circular or elliptic |
| Jularguard 3401 | about 38 | about 0.02 × 0.2 | Rectangular |

As is apparent from Table 1 above, the pore diameters of these micro-porous separators are smaller than 1 μm, and are much smaller than those of conventional nonwoven separators with several hundred pore diameter. Accordingly, the micro-porous separators are capable of effectively preventing the occurrence of internal short-circuiting in a battery which is due to the migration of cadmium active material and which cannot be prevented with the conventional nonwoven separator.

The oxygen gas absorbing performance required for an sealed battery will be described. The conventional nonwoven separator features excellent oxygen gas permeability because it holds the electrolyte well in the large pores, and therefore the negative electrode in the battery using the nonwoven separator exhibits excellent oxygen gas absorbing performance. On the other hand, it has been considered that, since the micro-porous separator with a small pore diameter exhibits considerably low oxygen gas permeability, the negative electrode of a sealed battery using the micro-porous plate features considerably low oxygen gas absorbing performance. For instance the micro-porous separator J3401 having rectangular micro-pores cannot be applied to a sealed battery. However, it should be noted that the negative electrode of the sealed battery using a micro-porous separator which is substantially equal in pore diameter to the micro-porous separator J3401 and is circular or elliptic in pore configuration offers satisfactory oxygen gas absorption ability in spite of the three-dimentional pores. Thus, the gas absorption ability depends greatly on the pore diameter, and therefore it is shown to be greatly affected by the oxygen gas permeability.

As is apparent from the above description, the micro-porous separator with circular or elliptic pores offers high oxygen gas absorbing performance and, because of the three-dimensional pores, is considerably effective in preventing the occurrence of internal short-circuiting in the battery which results from the migration of cadmium active material.

The use of the micro-porous separator described above in combination with the nonwoven separator is more advantageous in some respects than the use of it alone. For instance, the micro-porous separator is considerably thin as indicated in Table 1 above; that is, it has little mechanical strength. Therefore, during battery assembly, it may be broken thus causing internal short-circuiting. In addition, the micro-porous separator exhibits a low electrolyte holding characteristic, and therefore the battery using the micro-porous separator has a generally lower discharging characteristic than the battery using the conventional nonwoven separator. However, using the micro-porous separator and the nonwoven separator in combination can provide a battery having the advantages of the two separators. That is, a battery is provided which can be assembled with high efficiency, and which exhibits excellent charge and discharge characteristics and a long cycle life.

The technical concept of the invention is applied mainly to a nickel-cadmium battery. However it may be applied to an alkaline secondary battery, such as a silver-cadmium alkaline secondary battery, in which a cadmium negative electrode and a positive electrode producing oxygen gas at the end of charging or during overcharging are employed in combination.

As conductive to a full understanding of the invention, several examples of the sealed alkali secondary battery according to the invention are described as follows.

EXAMPLE 1

In a first example, 50 parts of cadmium oxide powder, 50 parts of metal cadmium powder having an average particle size of 2 μm, 5 parts of nickel hydroxide powder, and 0.1 part of polypropylene short fibers having a length of 1 mm were mixed, in the form of paste, with 30 ml ethylene glycol containing 1.5% polyvinyl alcohol by weight. The paste thus formed was applied to a copper-plated perforated steel plate, and dried and pressed, to provide a negative electrode which was 960 mAh in the theoretical capacity of cadmium oxide, and 2.9×14×52 (mm) in dimension. The metallic cadmium powder used for the manufacture of the negative electrode was prepared by a so-called "substitution method" of adding metallic zinc powder to a cadmium sulfate solution. The particle size was measured according to an air permeation method.

On the other hand, the positive electrode was manufactured as follows. A mixture solution (Ph - 2, specific gravity 1.5 (20° C.)) of nickel nitrate and cobalt nitrate 8% in cobalt content percentage was impregnated in a sintered nickel substrate of about 80% in porosity. The sintered nickel substrate was immersed in a sodium hydroxide solution 1.200 in specific gravity at 20° C., and washed with hot water and dried. This operation was repeatedly carried out until two positive plates 400 mAh in theoretical capacity and 1.4×14×52 (mm) in dimension were formed.

The negative electrode, after being wrapped with one polyethylene micro-porous separator (Trade name "PM10E" manufactured by RAI (USA) Co.) which was about 20 μm in thickness, and 0.095 μm in pore diameter and which had circular or elliptic micro-pores, was held between the two positive electrodes, and a potassium hydroxide of 2.4 ml and 1.250 specific gravity at 20° C. was used as an electrolyte, to fabricate a rectangular alkaline secondary battery (A) according to the invention which was 700 mAh in nominal capacity. The battery case was of synthetic resin.

EXAMPLE 2

A rectangular alkaline secondary battery (B) according to the invention was manufactured in the above-described manner except that one polyethylene micro-porous separator (Trade name "PM10E" manufactured by RAI (USA) Co.) which was about 28 μm and 0.095 μm in pore diameter and had circular or elliptic micro-pores piled on one polypropylene nonwoven separator 0.2 mm in thickness was used.

EXAMPLE 3

A rectangular alkali secondary battery (C) according to the invention was manufactured in the same manner as in the above-described concrete example 1 except that one polyethylene micro-porous separator (Trade name "PMP15E" manufactured by RAI (USA) Co.) which was about 38 μm and 0.16 μm in pore diameter and had circular or elliptic micro-pores piled on one polypropylene nonwoven separator 0.2 mm in thickness was used.

COMPARISON EXAMPLE 1

A conventional rectangular alkaline battery (D) was manufactured in the same manner as in the above-described concrete example 1 except that a polypropylene nonwoven separator 0.2 mm in thickness was used.

COMPARISON EXAMPLE 2

A rectangular alkaline secondary battery (E) for comparison was manufactured in the same manner as in the above-described concrete example 1 except that one polyethylene micro-porous separator (Trade name "Jularguard 3401" manufactured by Cellaneed (USA) Co.) which was about 25 μm and 0.02 μm to 0.2 μm in pore diameter and had rectangular micro-pores piled on one polypropylene nonwoven separator 0.2 mm in thickness was used.

The batteries thus manufactured each had a relief valve operating at 0.1 kg/cm². In each of the batteries, cadmium hydroxide for reserve was scarcely present, and, when the battery had been discharged, the content of cadmium hydroxide in the negative active material was about 0.95 times that of nickel hydroxide in the positive electrode active material (2.73 (g/Ah)/2.88 (g/Ah)), so as to achieve positive electrode and negative electrode charging substantially at the same time. In supplying electrolyte, the cadmium oxide in the negative electrode will consume water through the following reaction (2).

$$CdO + H_2O \rightarrow Cd(OH)_2 \qquad (2)$$

Therefore, water was additionally supplied in relation to the consumption.

The batteries (A) through (E) were weighed before and after they were over-charged with constant current at an ambient temperature of 20° C., and their oxygen gas absorption ability was evaluated from the differences in weight. (In a battery with low oxygen gas absorption ability, when over-charged the internal pressure in it is increased, so that the relief valve is operated to discharge the oxygen gas outside. Accordingly, the more the battery is reduced in weight during overcharging, the lower the oxygen gas absorption ability. This is the reason why the oxygen gas absorption ability can be evaluated from the difference between the weight of the battery measured before overcharged and the weight of the battery measured after overcharged.) The batteries were charged with a current of 0.25 C (C is on the basis of nominal capacity) for nominal capacity for twenty-four hours. The results are as indicated in the following Table 2:

TABLE 2

| Effect of Separator on Oxygen Gas Absorbing Performance | | |
| --- | --- | --- |
| Battery | Separator | Weight reduction (mg) |
| A | PM10E | 2.8 |
| B | PM10E + nonwoven separator | 2.3 |
| C | PM10E + nonwoven separator | 2.5 |
| D | nonwoven separator | 2.5 |
| E | Jularguard 3401 + nonwoven separator | 588.4 |

As is apparent from Table 2, the batteries (A), (B) and (C) using the micro-porous separator PM10E or PMP15E whose pores were circular or elliptic according to the invention exhibited much smaller weight reduction than the battery E for comparison using the convention micro-porous separator Jularguard 3401. In addition, they were equivalent to the conventional battery D using the nonwoven separator alone. In other words, the batteries using the microporous separator with the three-dimentional structure of a circular or elliptic pore configuration offered high oxygen gas absorption ability and excellent sealing characteristics. On the other hand, the battery for comparison using the micro-porous separator with a rectangular pore configuration offered low enclosing characteristics. The two kinds of micro-porous separators are different mainly in pore configuration. Thus, the gas absorption ability turned out to depend greatly on the pore configuration of the microporous separator used.

Each of the above-described batteries (A) through (E) were subject to a cycle test of charge and discharge, in which a battery is charged for thirty minutes with a 1.90 V constant voltage and a maximum current of 5 C at a temperature of 20° C. with reference to the nominal capacity, and then it is discharged to 1 V with a current of 1 C for the purpose of detecting the change in discharge capacity. In this regard it was determined that, when the discharge capacity became 60% of that in the first test cycle, the service life of the battery ended. FIG. 1 shows discharge capacity maintaining percentages in the cycle test of charge and discharge with the discharge capacity in the first test cycle as 100%. As is apparent from FIG. 1, the batteries (A), (B), and (C) of the invention had a discharge capacity of more than 60% even after the 2000-th test cycle, while the conventional battery (D) and the comparison battery (E) ended their service lives around the 1200-th test cycle and the 800-th test cycle, respectively.

The batteries (D) and (E) were tested to determine the cause of the reduction in discharge capacity. In the battery (D), internal short-circuiting took place. In the battery (E), the quantity of electrolyte was greatly decreased.

On the other hand, the batteries (A), (B) and (C) of the invention were not reduced in weight, and remained satisfactorily sealed. The batteries (B) and (C) were superior to the battery (A) in maintaining discharge capacity; that is, the use of the micro-porous separator having circular or elliptic pores in combination with the nonwoven separtor provides more advantageous discharge characteristics than the use of the micro-porous separator alone.

The invention has been described with reference to the sealed alkaline secondary battery which comprises the positive electrode essentially containing nickel hydroxide as active material, and the negative electrode essentially containing cadmium hydroxide and metal cadmium as active material, the ratio by weight of the cadmium hydroxide in the active material of the negative electrode to the nickel hydroxide in the active material of the positive electrode being a maximum of 0.95. That is, the present invention has been described in reference to a nickel-cadmium battery in which charging the positive plate and the negative plate is accomplished at the same time. This is based on the fact that in the battery the migration of cadmium active material occurs more readily than in the conventional nickel-cadmium battery whose negative electrode has cadmium hydroxide reserved. Accordingly, the technical concept of the invention is applicable to the conventional nickel-cadmium battery, too, in which the migration is less likely to occur when compared with the embodiment of the invention, providing effects similar to those of the above-described embodiment of the invention.

The embodiment of the invention has been described with reference to the battery with a plastic bonded cadmium negative electrode in which internal short circuiting is liable to occur. However, the technical concept of the invention is applicable to the battery with a sintered cadmium negative electrode in which the internal short-circuit infrequently takes place, and it has been confirmed that, in this case, the occurrence of internal short-circuiting is effectively suppressed.

Effects similar to those of the above-described embodiment of the invention may be obtained not only with the nickel-cadmium battery but also the battery which uses for the positive electrode an active material such as silver which produces oxygen gas at the end of the charging period or during over-charging.

As is apparent from the above description, the sealed alkaline secondary battery provided according to the invention can prevent the occurrence of internal short-circuiting due to the migration of cadmium active material, and offers a sufficiently long cycle life.

What is claimed is:

1. A sealed alkaline secondary battery comprising a cadmium negative electrode, a positive electrode, an electrolyte, and a gas-permeable micro-porous separator means, wherein said micro-porous separator means having one of circular and elliptic micro-pores for allowing gas migration between said positive electrode and said negative electrode, and for preventing internal short circuiting in a battery due to the migration of cadmium active material.

2. A sealed alkaline secondary battery as claimed in claim 1, further comprising an unwoven separator for use in conjunction with said micro-porous separator.

3. A sealed alkaline secondary battery as claimed in claim 1 wherein:
    said positive electrode essentially contains nickel hydroxide as an active material, and;
    said negative electrode essentially contains cadmium hydroxide and metallic cadmium as active materials, wherein the ratio by weight of the cadmium hydroxide in the active material of said negative electrode to the nickel hydroxide in the active material of said positive plate is a maximum of 0.95.

4. A sealed alkaline secondary battery as claimed in claim 2, wherein:
    said positive electrode essentially contains nickel hydroxide as an active material, and;
    said negative electrode essentially contains cadmium hydroxide and metallic cadmium as active materials, the ratio by weight of the cadmium hydroxide in the active material of said negative electrode to the nickel hydroxide in the active material of said positive electrode being a maximum of 0.95.

5. A sealed alkaline secondary battery as claimed in claim 1, wherein said battery is a nickel-cadmium battery.

6. A sealed alkaline secondary battery as claimed in claim 1, wherein said battery is a silver-cadmium alkaline secondary battery.

7. A sealed alkaline secondary battery as claimed in claim 1, wherein said cadmium negative electrode is a plastic bonded cadmium negative plate.

8. A sealed alkaline secondary battery as claimed in claim 1, wherein said cadmium negative electrode is a sintered cadmium negative plate.

9. A sealed alkaline secondary battery as claimed in claim 1, wherein said micro-porous separator is approximately 20 $\mu$m in thickness and approximately 0.095 $\mu$m in pore diameter.

10. A sealed alkaline secondary battery as claimed in claim 9, wherein said micro-porous separator is made from polyethylene.

11. A sealed alkaline secondary battery as claimed in claim 2, wherein said micro-porous separator is approximately 28 $\mu$m in thickness and approximately 0.095 $\mu$m in pore diameter.

12. A sealed alkaline secondary battery as claimed in claim 11, wherein said micro-porous separator is made from polyethylene.

13. A sealed alkaline secondary battery as claimed in claim 12, wherein said unwoven separator is a polypropylene unwoven cloth approximately 0.2 mm in thickness.

14. A sealed alkaline secondary battery as claimed in claim 13, wherein said micro-porous separator is piled on said unwoven separator.

15. A sealed alkaline secondary battery as claimed in claim 2, wherein said micro-porous separator is approximately 38 $\mu$m in thickness and approximately 0.16 $\mu$m in pore diameter.

16. A sealed alkaline secondary battery as claimed in claim 15, wherein said micro-porous separator is made of polyethylene.

17. A sealed alkaline secondary battery as claimed in claim 16, wherein said unwoven separator is a polypropylene unwoven cloth approximately 0.2 mm in thickness.

18. A sealed alkaline secondary battery as claimed in claim 17, wherein said micro-porous separator is piled on said unwoven separator.

19. A sealed alkaline secondary battery as claimed in claim 1, wherein a thickness of said micro-porous separator is in a range between 20 $\mu$m and 38 $\mu$m, and a pore diameter of said micro-porous separator is in a range between 0.095 $\mu$m and 0.16 $\mu$m.

* * * * *